(12) United States Patent
Jha et al.

(10) Patent No.: US 9,485,664 B2
(45) Date of Patent: Nov. 1, 2016

(54) IDLE MODE CELL SELECTION FOR LICENSED SHARED ACCESS

(71) Applicant: Intel Corporation, Santa Clara, CA (US)

(72) Inventors: Satish Chandra Jha, Hillsboro, OR (US); Mohammad Mamunur Rashid, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 14/309,427

(22) Filed: Jun. 19, 2014

(65) Prior Publication Data

US 2015/0373552 A1    Dec. 24, 2015

(51) Int. Cl.
*H04W 36/00* (2009.01)
*H04W 16/14* (2009.01)

(52) U.S. Cl.
CPC ................... *H04W 16/14* (2013.01)

(58) Field of Classification Search
None
See application file for complete search history.

(56) References Cited

U.S. PATENT DOCUMENTS

| | | | |
|---|---|---|---|
| 2002/0032032 A1* | 3/2002 | Haumont et al. | 455/436 |
| 2012/0020231 A1* | 1/2012 | Chen et al. | 370/252 |
| 2013/0295948 A1 | 11/2013 | Ye et al. | |
| 2014/0011509 A1 | 1/2014 | Markwart et al. | |
| 2014/0162617 A1 | 6/2014 | Mueck et al. | |
| 2014/0162666 A1 | 6/2014 | Ratasuk et al. | |
| 2015/0334717 A1* | 11/2015 | Rashid et al. | H04W 15/14 |
| 2015/0351148 A1* | 12/2015 | Jha et al. | H04W 76/028 |

FOREIGN PATENT DOCUMENTS

WO    WO-2015195260 A1    12/2015

OTHER PUBLICATIONS

"International Application Serial No. PCT/US2015/031488, International Search Report mailed Jul. 3, 2015", 3 pgs.
"International Application Serial No. PCT/US2015/031488, Written Opinion mailed Jul. 3, 2015", 5 pgs.

* cited by examiner

*Primary Examiner* — Chi H Pham
*Assistant Examiner* — Shick Hom
(74) *Attorney, Agent, or Firm* — Schwegman Lundberg & Woessner, P.A.

(57) ABSTRACT

A 3GPP LTE protocol enhancement realizes the full benefit of proposed dynamic frequency sharing systems by enhancing current idle mode cell selection mechanisms to support Licensed Shared Access (LSA) cell selection of idle User Equipment (UE) when LSA frequency bands are reclaimed by incumbents. A paging message field, LSAUnavailable is transmitted by Evolved Node Bs for those UEs operating in an idle state. Paging message transmission is repeated for robustness. UEs are also enabled to immediately identify LSA unavailability when a paging message notification of LSA unavailability to idle UEs cannot be transmitted and/or received. A UE comprises a processor and transceiver configured to receive, on a Licensed Shared Access (LSA) frequency band, a paging message notifying the UE of (LSA) frequency band reclamation. The UE performs immediate cell reselection to vacate the reclaimed LSA frequency band and move to the UE operator's licensed primary Long Term Evolution frequency band.

22 Claims, 6 Drawing Sheets

US 9,485,664 B2

IDLE MODE CELL SELECTION FOR LICENSED SHARED ACCESS

TECHNICAL FIELD

Examples generally relate to Long Term Evolution (LTE) networks. One or more examples relate to the implementation of Licensed Shared Access (LSA) in LTE networks.

BACKGROUND

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. All multiple access wireless communication systems require sufficient access to available radio spectrum for supporting bearer service requirements.

Licensed Shared Access (LSA) is a new innovative framework that enables more efficient usage of available spectrum by allowing coordinated shared access to licensed spectrum for addressing spectrum shortage. Currently, there is no protocol or signaling mechanism provided in the 3GPP LTE standard for moving idle User Equipment (UE) from LSA band(s) to primary LTE band(s) during LSA reclamation by owner incumbents. Thus, in order to realize the full benefit of proposed dynamic frequency sharing systems, there is now a need for enhancements in a 3GPP LTE standard to enable efficient handoff of idle UEs from LSA frequency bands to Primary LTE bands during LSA reclamation.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
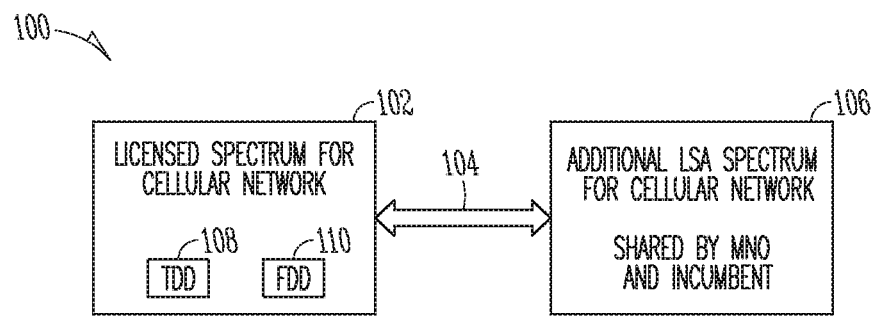
FIG. 1 shows a high level block diagram illustrating and example of dynamic frequency sharing in a cellular network, according to some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "User Equipment" (UE) as used herein refers to a wireless communication device such as a cellular telephone, smartphone, tablet, netbook, wireless terminal, laptop computer, femtocell, High Data Rate (HDR) subscriber station, access point, access terminal, or other personal communication system (PCS) device. The device may be either mobile or stationary.

The term "access point" as used herein may be a fixed station. An access point may also be referred to as an access node, a base station or some other similar terminology known in the art. An access terminal may also be called a mobile station, a User Equipment (UE), a wireless communication device or some other similar terminology known in the art.

The terms "relinquish", "release" and "return" are used herein to mean the surrender of LSA spectrum to its incumbent.

Cellular networks, such as LTE, can allow a device to connect to or communicate with other devices. Modern LTE networks can include both large and small cells configured in a Heterogeneous Network (HetNet) configuration. The base stations (e.g., Evolved Node Bs (eNodeBs)) of large and small cells can be configured to operate on different frequency bands. Frequency band spectrum, adequate for the various types of communication content, is needed for a base station to connect to, or communicate with, other devices.

Licensed Shared Access (LSA) can significantly enhance the capacity of 3GPP LTE systems by providing a mechanism to extend available spectrum. Currently, a number of LTE compatible spectrum bands (e.g. 100 MHz in 2.3 GHz band, 100+MHz in 2.6 GHz band) are being considered for LSA application. An LSA spectrum sharing framework is strongly backed and urgently awaited by major wireless equipment vendors, operators, regulators, government bodies and standardization bodies. In this framework, an incumbent spectrum holder allows coordinated shared access to an unused portion of its licensed spectrum by a group of secondary users (i.e., network operators), such that a large portion of wireless spectrum that otherwise remains unused becomes available to network operators for meeting the ever increasing traffic demand over LTE networks.

In spite of ongoing innovation to extract greater throughput and data rates from the available spectrum, projected traffic growth indicates that mobile broadband operators will no longer be able to meet demand with their fixed licensed spectrum because the pool of available spectrum for licensing is limited and cannot grow with the increasing demand. The LSA framework addresses this limitation by allowing an incumbent user, also known as a Primary Spectrum Holder (PSH), to share coordinated access to an unused portion of its licensed spectrum with a group of secondary spectrum holders (SSH). The PSH however retains exclusive right to the spectrum and can reclaim the spectrum from SSHs. When using the LSA framework to acquire supplemental spectrum, LTE networks are required to adapt to the dynamic nature of the available spectrum by gracefully accommodating spectrum reclamations by PSHs.

An LTE base station E Node B (eNB) releases the LSA band once it is notified of an upcoming reclamation by the PSH. If a short grace period is given, the eNB may complete steps for the spectrum release within that time by moving, or handing over, UEs that are connected to their eNBs through the LSA band to the LTE operator's primary LTE band.

Current 3GPP LTE specifications do not provide signaling and protocol support for cell selection of idle UEs when there is insufficient, or no, grace period for notifying affected UEs. Handover of idle UEs may also be known as cell reselection. For simplicity, the term "handover" may also be interchangeably used herein to mean idle UE cell reselection. In current 3GPP specifications, the eNB may be unable to inform UEs in idle mode to move to their LTE bands promptly when the eNB receives a directive to release the LSA band. An idle UE on the LSA band can detect the connection loss only after a few serving cell evaluation periods. Currently, the neighboring cell measurement is initiated for cell reselection only if the serving cell evaluation does not fulfill s-criteria (the criteria defined to decide if the cell is still suitable) for a substantial period, depending on the paging cycle (i.e. Idle DRX Cycle). Packets arriving during this period will be delayed, adversely impacting the user experience. Paging can be used by an eNB to send notification to the idle users. For example, paging is used for notifications such as system information update indication and indication of downlink traffic for the UE. The paging message can also be modified to notify the idle UEs on LSA band about upcoming unavailability of LSA band. However, when sufficient notice of LSA frequency band reclamation is not provided by the incumbent, the notifying paging message may not be received by affected UE's before the LSA is no longer available. Therefore, there is a need for methodologies by which idle mode cell selection support can be incorporated into the current 3GPP LTE framework to address idle mode UE transfer to primary LTE bands, introduced by LSA in LTE networks.

Idle Mode Cell Selection for Licensed Shared Access enhances the current 3GPP LTE cell selection framework by incorporating an idle mode cell selection model that is well suited for LSA deployment in 3GPP LTE networks. More specifically, an enhancement to the current cell selection model to provide mechanisms to make UEs aware of LSA band unavailability as soon as the eNB is instructed to release the band is detailed in FIGS. 1-6.

FIG. 1 shows a high level block diagram illustrating an example of dynamic LSA frequency sharing in a cellular network. FIG. 1 depicts an example of a system 100 that comprises a primary (legacy) LTE band 102 receiving spectrum from or returning spectrum to, at arrow 104, additional LSA frequency band 106. The primary LTE band 102 may include a Time Division Duplexing (TDD) band 108 or a Frequency Division Duplexing (FDD) band 110. The additional spectrum from the additional LSA frequency band 106 may also be TDD or FDD bands.

Figure 2:
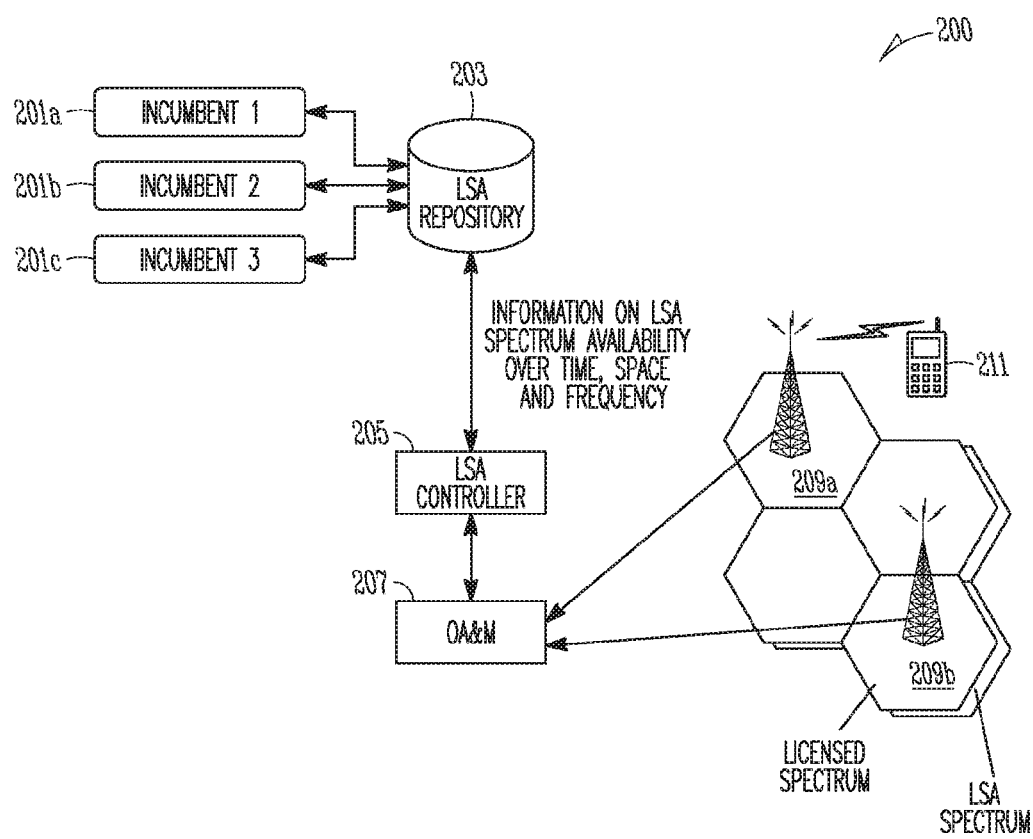
FIG. 2 shows a high level diagram illustrating an exemplary LSA system, according to some embodiments.

FIG. 2 shows a high level diagram illustrating an exemplary traditional Licensed Shared Access (LSA) system 200. In the traditional LSA system 200, incumbents 201a-c are original spectrum owners. An LSA Repository 203 is a data base containing information on spectrum availability and shorter term aspects of spectrum sharing. The LSA Repository 203 is communicatively coupled to an LSA controller 205, which performs information management and translates LSA Repository 203 data base contents into spectrum access conditions for LSA frequency licensees, while an Operator Administration and Management (OA&M) 207 provides operations, administration, and management for the network operator's network. The OA&M 207 manages limited short term additional spectrum for the network operator's eNBs, or base stations, 209a-b serving User Equipment(s) 211.

Figure 3:
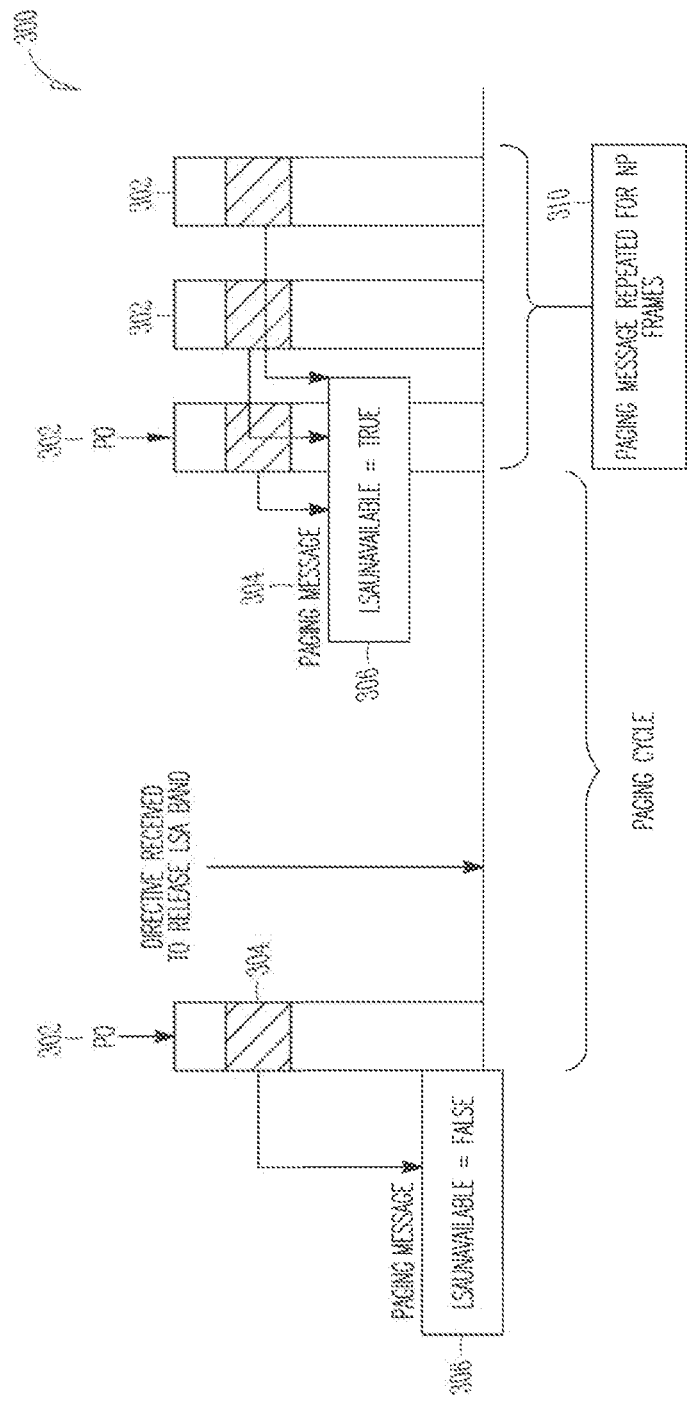
FIG. 3 is a high level overview illustration of Idle Mode Cell selection For Licensed Shared Access, according to some embodiments.

FIG. 3 is a high level overview block diagram of Idle Mode Cell selection for Licensed Shared Access 300, according to some embodiments that enhance current 3GPP LTE cell selection models by incorporating a mechanism for allowing an idle UE 211 to detect LSA unavailability as soon as possible when an eNB 209 is unable to send, or the UE 211 is unable to receive, paging message 304 due to an insufficient grace period. The disclosed signaling mechanism assures that idle UEs 211 communicating on LSA frequency bands 106 promptly move to primary LTE bands 102 whenever the LSA frequency band 106 is due to become unavailable or becomes unavailable.

A paging message 304 is utilized by the eNB 209 to convey the upcoming unavailability of the LSA frequency band 106 once the directive 308 to release the LSA frequency band 106 has been received by the eNB 209. The novel paging message 304 is equipped with a repetition mechanism 310 to minimize the probability of idle UEs 211 failing to detect the paging message 304. In the event that the paging message 304 is not detected by the idle UE 211, or if a grace period is too short for the paging message 304 to be received, a protocol is provided whereby UEs 211 infer the LSA band reclamation and move to the primary LTE band 102 accordingly. This mechanism provides an improved user experience by providing notice to idle users about LSA unavailability so that they perform cell reselection to the primary LTE band 102 promptly.

Upon receiving notification of LSA frequency band 106 reclamation, the eNB 209 determines if the upcoming Paging Occasion (PO) 302 consists of idle UEs 211 on the LSA frequency band 106. If idle UEs 211 are assigned to the LSA frequency band 106, the eNB 209 transmits a paging message 304 on the LSA frequency band 106 informing the UEs 211 that the LSA frequency band 106 is imminently unavailable. The current 3GPP LTE paging message 304 is enhanced to comprise a novel optional field indicating the imminent LSA frequency band 106 unavailability. The enhanced field may be known as "LSAUnavailable" 306. The eNB 209 may transmit a paging message 304 having the novel "LSAUnavailable" 306 field equal to true when the LSA frequency band 106 has been reclaimed, or equal to false if there has been no such LSA frequency band 106 reclamation event since the last PO 302.

When a UE 211 receives a paging message 304 having the enhanced "LSAUnavailable" 306 field equal to true, the UE 211 will perform cell reselection to move to the operator's licensed primary LTE band 102. The enhanced "LSAUnavailable" 306 field value of true may cause the network operator's licensed primary LTE band 102 to be considered a highest priority frequency for cell detection, cell measurement and cell reselection. The enhanced paging message 304 is transmitted regardless of present downlink data or Earthquake and Tsunami Warning System/Commercial Mobile Alert System/System Information (CMAS/ETWS/SI) update information for any of the UEs 211 associated with the PO 302, such that the UE 211 invariably receives the paging message 304 during its PO 302. To further ensure robust receipt of this enhanced paging message 304, transmission may be repeated by the repetition mechanism 310 every radio frame starting from the Paging frame for $N_p$, where $N_p$ is an integer. $N_p$ may be broadcast as part of system information and may be previously stored by the UE 211.

The current 3GPP Paging message field descriptions are enhanced to support Idle Mode Cell selection for Licensed Shared Access by adding an "LSAUnavailable" 306 field, shown in bold in Table 1.

TABLE 1 cmas-Indication
If present: indication of a CMAS notification.
cn-Domain
Indicates the origin of paging.
eab-ParamModification
If present: indication of a EAB parameters (SIB14) modification.
etws-Indication
If present: indication of an ETWS primary notification and/or ETWS secondary notification.
Imsi
The International Mobile Subscriber Identity, a globally unique permanent subscriber identity, see TS 23.003 [27]. The first element contains the first MSI digit, the second element contains the second IMSI digit and so on.
systemInfoModification
If present: indication of a BCCH modification other than SIB10, SIB11, SIB12 and SIB14.
ue-Identity
Provides the NAS identity of the UE that is being paged.
LSA Unavailable
If present: indication that LSA band is unavailable or is due to be unavailable soon

In another embodiment, where there is an insufficient or no grace period, the eNB 209 may be unable to transmit a paging message 304 indicating LSA unavailability. In this embodiment, when a UE 211 does not receive any paging messages 304 for $N_{np}$ consecutive PO 302 times (where $N_{np}$ is an integer), the UE 211 then remains awake for $N_{mib}$ (where $N_{mib}$ is also an integer) radio frames after the PO 302 and reads the Master Information Block (MIB). The MIB is scheduled with a fixed pre-defined repetition rate. The MIB is transmitted every 10 ms (i.e., every radio frame) at a known location. When the UE 211 cannot receive the MIB successfully within $N_{mib}$ radio frames, the UE 211 determines that the LSA frequency band 106 has been reclaimed by its incumbent 201. $N_{np}$ and $N_{mib}$ may be broadcast in System Information Block (SIB) or transmitted to UEs 211 while moving the UEs 211 to idle in a Radio Resource Control Connection Release message. In some embodiments, an $N_{np}$ value may be equal to 1, 2 or 3, and an $N_{mib}$ value may be equal to 1 or 2. The $N_{np}$ and $N_{mib}$ may be stored in the UE 211.

Figure 4A:
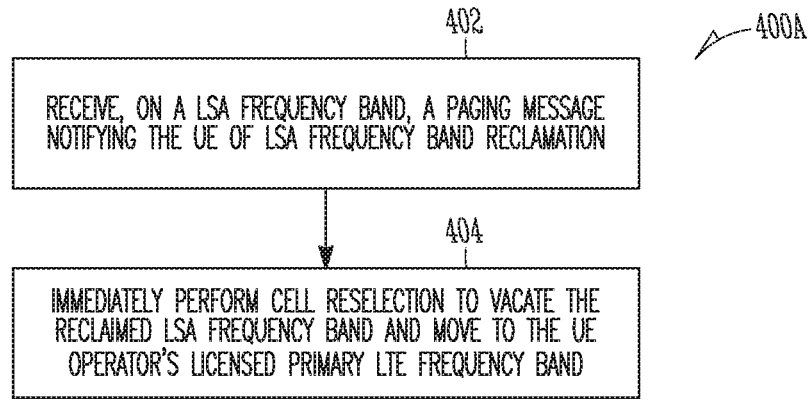
FIGS. 4A and 4B are high level overview flow charts illustrating Idle Mode Cell selection For Licensed Shared Access according to various example embodiments.

FIG. 4A is a high level overview flow chart 400A illustrating Idle Mode Cell selection For Licensed Shared Access according to some example embodiments having sufficient notice for paging message notification of LSA frequency band reclamation. If an incumbent 201 provides a sufficient grace period before reclaiming its LSA frequency band 106, a UE 211 may receive a paging message 304 notifying it of LSA frequency band 106 reclamation in operation 402. The notification causes the UE 211 to immediately perform cell reselection to vacate the reclaimed LSA frequency band 106 and move to the UE operator's licensed primary LTE band 102 in operation 404.

Figure 4B:
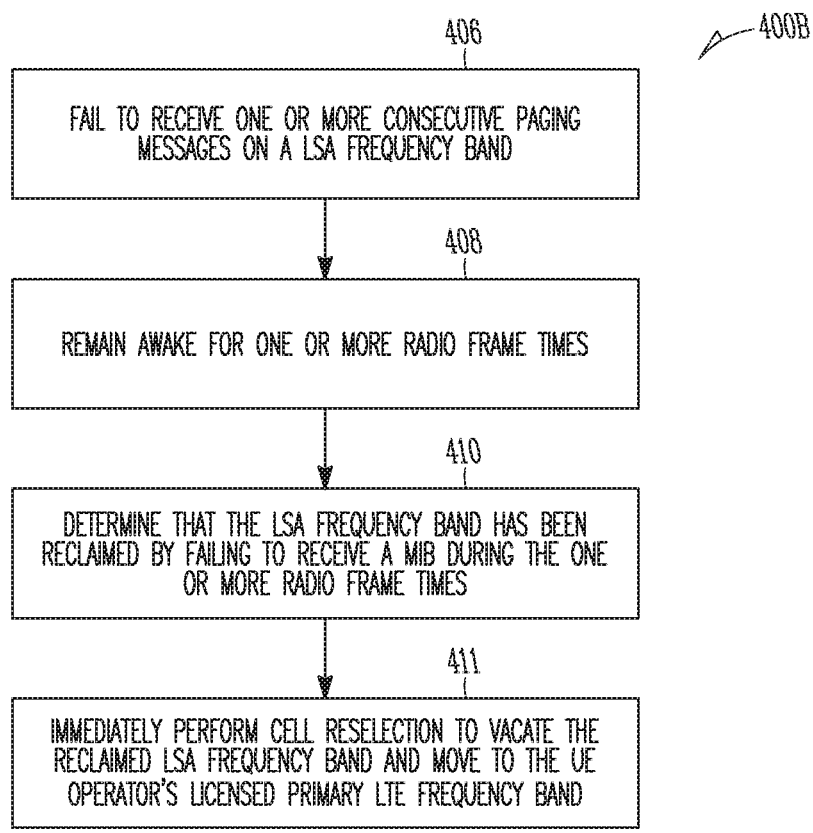

FIG. 4B is a high level overview flow chart 400B illustrating Idle Mode Cell selection For Licensed Shared Access according to some example embodiments having insufficient notice for paging message notification of LSA frequency band 106 reclamation. When the incumbent 201 provides no grace period before reclaiming its LSA frequency band 106, or the period is not long enough for UEs 211 to receive a paging message notifying it of the reclamation before the loss of the LSA frequency band 106, the UE 211 will fail to receive consecutive paging messages on the LSA frequency band 106 in operation 406. The UE 211 will then remain awake for one or more radio frame times in operation 408 before determining that the LSA frequency band 106 has been reclaimed by failing to receive a MIB during the one or more radio frame times in operation 410. The UE 211 then immediately performs cell reselection to move to the operator's licensed primary LTE band 102 in operation 411.

Figure 5:
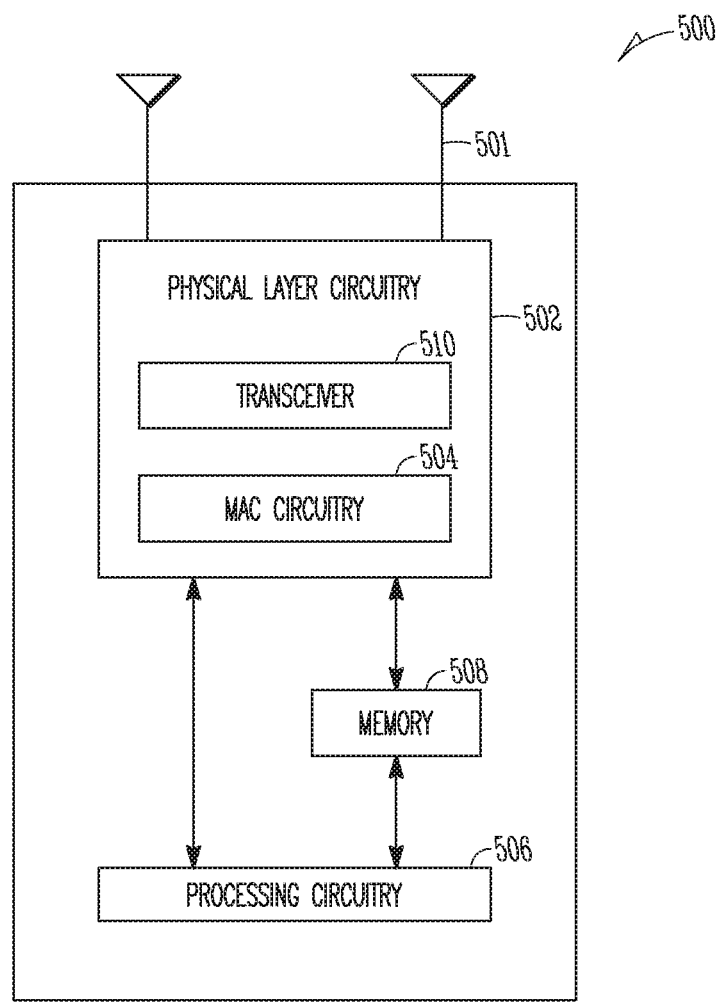
FIG. 5 shows a functional diagram of an exemplary communication station in accordance with some embodiments.

FIG. 5 shows a functional diagram of an exemplary communication station 500 in accordance with some embodiments. In one embodiment, FIG. 5 illustrates a functional block diagram of a communication station 500 that may be suitable for use as an eNB 209 or UE 211 (FIG. 2) in accordance with some embodiments. The communication station 500 may also be suitable for use as a handheld device, mobile device, cellular telephone, smartphone, tablet, netbook, wireless terminal, laptop computer, femtocell, High Data Rate (HDR) subscriber station, access point, access terminal, or other personal communication system (PCS) device.

The communication station 500 may include physical layer circuitry 502 having a transceiver 510 for transmitting and receiving signals to and from other communication stations using one or more antennas 501. The physical layer circuitry 502 may also comprise medium access control (MAC) circuitry 504 for controlling access to the wireless medium. The communication station 500 may also include processing circuitry 506 and memory 508 arranged to perform the operations described herein. In some embodiments, the physical layer circuitry 502 and the processing circuitry 506 may be configured to perform operations detailed in FIGS. 3 and 4.

In accordance with some embodiments, the MAC circuitry 504 may be arranged to contend for a wireless medium and configure frames or packets for communicating over the wireless medium and the physical layer circuitry 502 may be arranged to transmit and receive signals. The physical layer circuitry 502 may include circuitry for modulation/demodulation, upconversion/downconversion, filtering, amplification, etc. In some embodiments, the processing circuitry 506 of the communication station 500 may include one or more processors. In some embodiments, two or more antennas 501 may be coupled to the physical layer circuitry 502 arranged for sending and receiving signals. The memory 508 may store information for configuring the processing circuitry 506 to perform operations for configuring and transmitting message frames and performing the various operations described herein. The memory 508 may comprise any type of memory, including non-transitory memory, for storing information in a form readable by a machine (e.g., a computer). For example, the memory 508 may comprise a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

In some embodiments, the communication station 500 may include one or more antennas 501. The antennas 501 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

Figure 6:
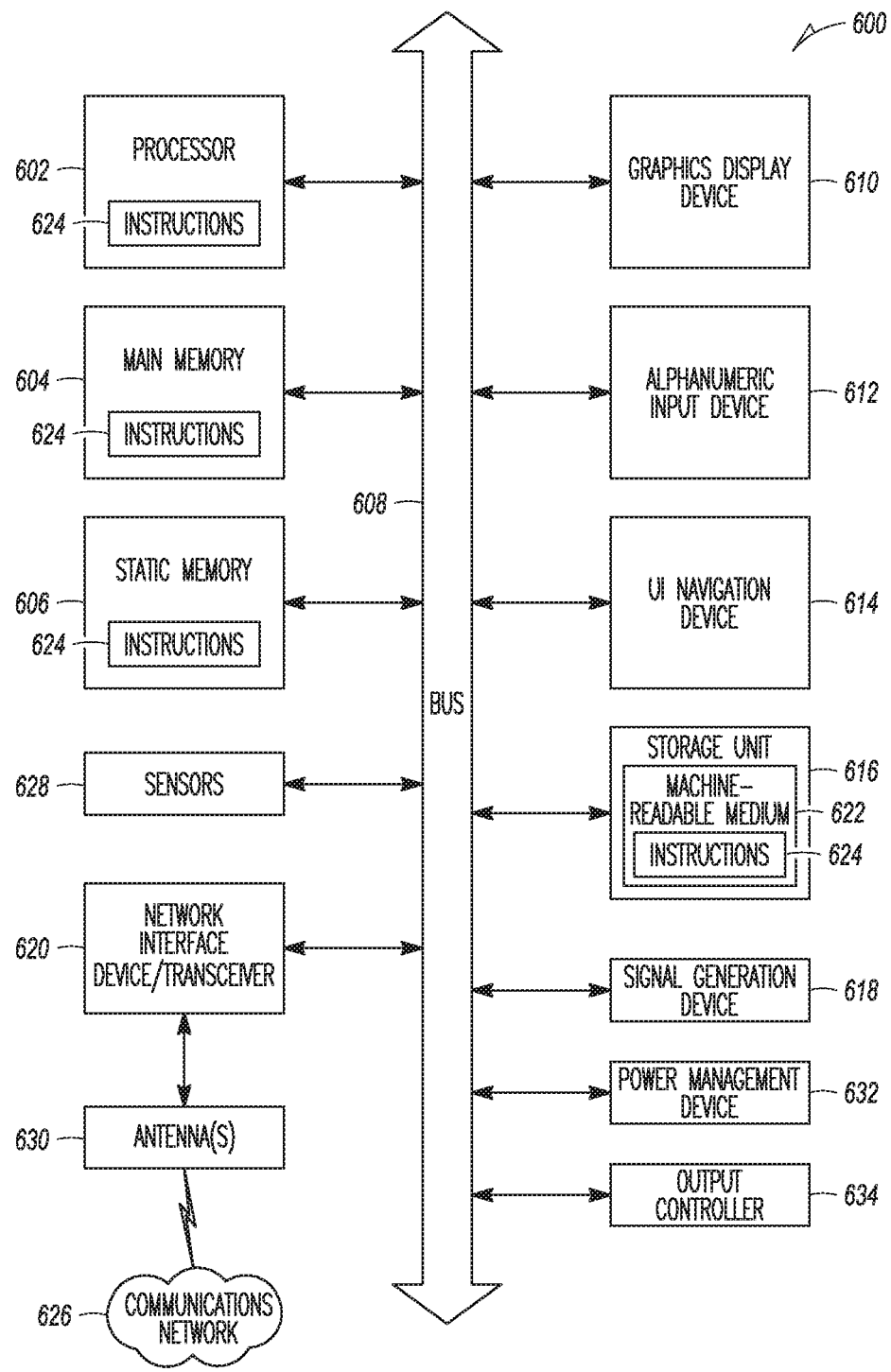
FIG. 6 shows a block diagram of an example of a machine upon which, any of one or more techniques (e.g., methods) discussed herein may be performed.

FIG. 6 illustrates a block diagram of an example of a machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612 and UI navigation device 614 may be a touch screen display. The machine 600 may additionally include a storage device 616 (i.e., drive unit), a signal generation device 618 (e.g., a speaker), a network interface device/transceiver 620 coupled to antenna(s) 630, and one or more sensors 628, such as a global positioning system (GPS) sensor, compass, accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions 624 for execution by the machine 600 and that cause the machine 600 to perform any one or more of the techniques of the present disclosure, or that is capable of storing, encoding or carrying data structures used by or associated with instructions 624. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 624 for execution by the machine 600, and includes digital or analog communications signals or other intangible media to facilitate communication of such software.

In one embodiment, a User Equipment (UE) comprises a processor and transceiver configured to receive, on a Licensed Shared Access (LSA) frequency band, a paging message notifying the UE of (LSA) frequency band reclamation, perform immediate cell reselection to vacate the reclaimed LSA frequency band and move to the UE operator's licensed primary Long Term Evolution (LTE) frequency band.

In another embodiment, a non-transitory computer readable storage device includes instructions stored thereon, which when executed by a machine, cause the machine to perform operations to a UE comprises a processor and transceiver configured to receive, on a LSA frequency band, a paging message notifying the UE of (LSA) frequency band reclamation, and perform immediate cell reselection to vacate the reclaimed LSA frequency band and move to the UE operator's licensed primary Long Term Evolution LTE frequency band.

In another embodiment, a UE comprises a processor and transceiver configured to fail to receive, on a LSA frequency band, one or more consecutive paging messages, remain awake for one or more radio frame times, determine that the LSA frequency band has been reclaimed by failing to receive a Master Information Block (MIB) during the one or more radio frame times, and perform immediate cell reselection to vacate the reclaimed LSA frequency band and move to the UE operator's licensed primary LTE frequency band.

In yet another embodiment, an eNB comprises hardware processing circuitry configured to receive a directive to reclaim a LSA frequency band, and transmit, to affected UE, a paging message on the Licensed LSA frequency band notifying the UE of LSA frequency band reclamation.

What is claimed is:

1. A User Equipment (UE) comprising a processor and transceiver configured to:
   receive, on a Licensed Shared Access (LSA) frequency band, a paging message identifying a reclaimed LSA frequency band and notifying the UE of reclamation of the reclaimed LSA frequency band; and
   perform cell reselection to vacate the reclaimed LSA frequency band and move to a licensed primary Long Term Evolution (LTE) frequency band belonging to a network operator of the UE.

2. The UE of claim 1 wherein the paging message comprises a "LSAUnavailable" field to indicate the LSA frequency band reclamation.

3. The UE of claim 2 wherein a value of the "LSAUnavailable" field equal to "true" is configured to indicate the LSA frequency band reclamation.

4. The UE of claim 1 further configured to consider the licensed primary LTE band belonging to the network operator a highest priority frequency band for cell detection, cell measurement and cell reselection, when the paging message notifying the UE of LSA frequency band reclamation is received.

5. The UE of claim 1 wherein a value of the "LSAUnavailable" field equal to "false" is configured to indicate a lack of a LSA frequency band reclamation event since a last paging opportunity.

6. The UE of claim 1 further configured to remain awake for $N_{mib}$ radio frames, where $N_{mib}$ is an integer value, when consecutive paging messages are not received.

7. The UE of claim 6 further configured to receive $N_{mib}$ in a System Information Block.

8. The UE of claim 6 further configured to receive $N_{mib}$ in a Radio Resource Control Connection Release message while moving to an idle state.

9. The UE of claim 6 further configured to store $N_{mib}$ in a memory of the UE.

10. The UE of claim 9 wherein $N_{mib}$ is equal to 1 or 2.

11. The UE of claim 1 further configured to determine that the LSA frequency band has been reclaimed by when a Master Information Block (MIB) has not been received during one or more radio frame times, and then perform cell reselection.

12. A method for cell reselection in a wireless network comprising operations to cause a User Equipment (UE) to perform the following operations:
receiving on a Licensed Shared Access (LSA) frequency band, a paging message alerting the UE of a loss of the LSA frequency band; and
performing cell reselection.

13. The method of claim 12 wherein the paging message comprises a "LSAUnavailable" field to alert the UE of the loss of the LSA frequency band.

14. The method of claim 13 wherein a value of the "LSAUnavailable" field equal to "true" is configured to indicate the loss of the LSA frequency band.

15. The method of claim 12 wherein the cell reselection connects the UE to a licensed primary Long Term Evolution (LTE) band belonging to a network operator of the UE.

16. The method of claim 12 wherein a licensed primary Long Term Evolution (LTE) band belonging to a network operator is a highest priority frequency band for cell reselection.

17. A non-transitory computer readable storage device including instructions stored thereon, which when executed by one or more processor(s) of a User Equipment (UE), cause the UE to perform operations to:
receive, on a Licensed Shared Access (LSA) frequency band, a paging message notifying the UE of a LSA frequency band reclamation event; and
disconnect from the LSA frequency band, and connect to a primary Long Term Evolution (LTE) frequency band of a network operator.

18. An Evolved Node B (eNB) comprising hardware processing circuitry configured to:
receive a directive to reclaim a Licensed Shared Access (LSA) frequency band; and
transmit, to an affected User Equipment (UE), a paging message on the LSA frequency band notifying the UE of LSA frequency band reclamation.

19. The eNB of claim 18 further configured to repeat transmission of the paging message notifying the UE of LSA frequency band reclamation.

20. The eNB of claim 18 further configured to repeat transmission of the paging message notifying the UE of LSA frequency band reclamation $N_p$ consecutive times at $N_p$ paging opportunities, where $N_p$ is an integer value.

21. The eNB of claim 20 further configured to transmit $N_p$ in a System Information Block.

22. The eNB of claim 18 further configured to transmit the paging message regardless of present downlink data and update information.

* * * * *